United States Patent
Yamamichi

(10) Patent No.: US 10,198,149 B2
(45) Date of Patent: Feb. 5, 2019

(54) INFORMATION PROCESSING APPARATUS, AND METHOD OF CONTROLLING INFORMATION PROCESSING APPARATUS

(71) Applicant: CANON KABUSHIKI KAISHA, Tokyo (JP)

(72) Inventor: Masaki Yamamichi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 294 days.

(21) Appl. No.: 14/841,272

(22) Filed: Aug. 31, 2015

(65) Prior Publication Data

US 2016/0062575 A1 Mar. 3, 2016

(30) Foreign Application Priority Data

Sep. 2, 2014 (JP) .................... 2014-177848

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0483* (2013.01); *G06F 3/04847* (2013.01); *G06F 8/38* (2013.01); *G06F 9/451* (2018.02); *H04N 1/00413* (2013.01); *H04N 1/00474* (2013.01); *H04N 1/00503* (2013.01); *H04N 1/00514* (2013.01); *G06F 9/44505* (2013.01)

(58) Field of Classification Search
CPC ........ G06F 3/0482; G06F 3/0483; G06F 8/38; H04N 1/00503
See application file for complete search history.

(56) References Cited

U.S. PATENT DOCUMENTS 8,205,169 B1 6/2012 Donohoe
9,513,785 B2* 12/2016 Bump ............... G05B 19/41845
(Continued)

FOREIGN PATENT DOCUMENTS

JP H09-204289 A 8/1997
JP 11-312036 A 11/1999
(Continued)

OTHER PUBLICATIONS

Microsoft Office 2010 Upgrade Guide, Fujitsu FOM Limited, vol. 1, pp. 6-7, published Apr. 3, 2014.

*Primary Examiner* — Omar R Abdul-Ali
(74) *Attorney, Agent, or Firm* — Canon U.S.A., Inc. IP Division

(57) ABSTRACT

An information processing apparatus that executes an application including a plurality of user interfaces displaying information corresponding to a plurality of edit modes includes storing information about controls arranged in each of the plurality of user interfaces displayed on a display, managing the information about controls arranged in each of the plurality of user interfaces, acquiring an edit mode selected when customization of the plurality of user interfaces is instructed, acquiring control information about a control executable in the acquired edit mode, displaying, on a screen for customizing the plurality of user interfaces, a list of the acquired control information, and receiving an instruction to edit the plurality of user interfaces.

8 Claims, 15 Drawing Sheets

(51) Int. Cl.
  *G06F 3/0483* (2013.01)
  *H04N 1/00* (2006.01)
  *G06F 9/451* (2018.01)
  *G06F 8/38* (2018.01)
  *G06F 9/445* (2018.01)

(56) References Cited

U.S. PATENT DOCUMENTS

| | | | |
|---|---|---|---|
| 2005/0210408 A1* | 9/2005 | Baranda | G06F 9/4443 |
| | | | 715/810 |
| 2006/0206834 A1* | 9/2006 | Fisher | G06F 17/30528 |
| | | | 715/777 |
| 2007/0143701 A1* | 6/2007 | Iremonger | G06F 3/048 |
| | | | 715/777 |
| 2010/0157359 A1* | 6/2010 | Steiner | G06F 3/1204 |
| | | | 358/1.15 |
| 2010/0169805 A1 | 7/2010 | Wilson | |
| 2010/0199211 A1* | 8/2010 | Igawa | G06F 3/0483 |
| | | | 715/777 |
| 2011/0314407 A1* | 12/2011 | Cruz Moreno | G06F 17/30899 |
| | | | 715/777 |
| 2013/0019194 A1* | 1/2013 | Vitt | G06F 8/38 |
| | | | 715/769 |

FOREIGN PATENT DOCUMENTS

| | | |
|---|---|---|
| JP | 2002-244785 A | 8/2002 |
| JP | 2004-242200 A | 8/2004 |

\* cited by examiner

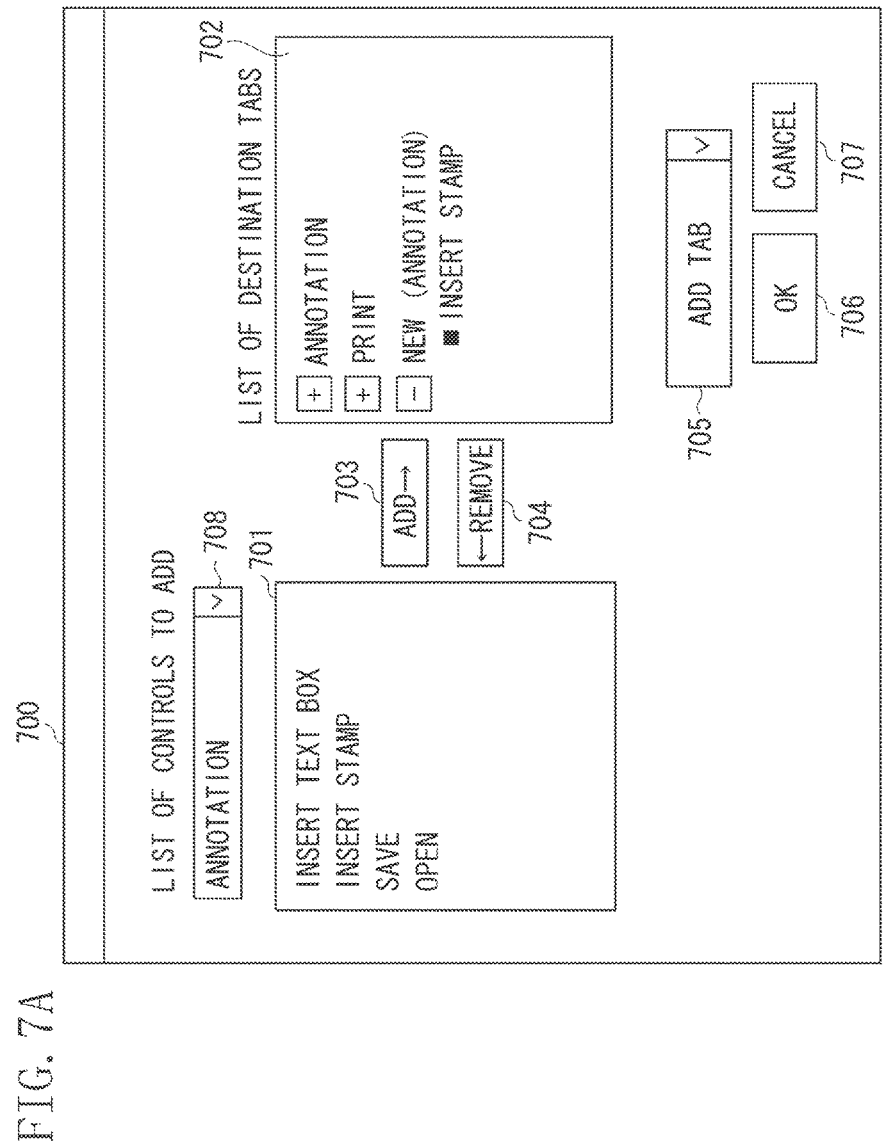

INFORMATION PROCESSING APPARATUS, AND METHOD OF CONTROLLING INFORMATION PROCESSING APPARATUS

BACKGROUND

Field

Aspects of the present invention generally relate to information processing apparatuses and methods of controlling an information processing apparatus.

Description of the Related Art

Conventionally, a function provided by an application running on an information processing apparatus (computer) is realized by arranging a control (user interface (UI) such as button, dropdown list, etc.) on a UI. However, as the number of functions is increased, there are cases where a large number of controls is arranged on the same screen, or controls having functions that are desired by an user are separately arranged. In these cases, it may take time for the user to find a control that has a desired function.

Meanwhile, there exists a function to customize controls on a UI by a user instruction. Specifically, edit controls (e.g., buttons, etc.) provided for executing edit commands (edit processing) can be arranged in positions desired by the user.

Further, Japanese Patent Application Laid-Open No. 11-312036 discusses a technique that each function to be used is associated with the level of importance to automatically arrange controls.

Further, there exists an application in which controls each providing a function are arranged together for each tab and then the controls to be displayed are changed according to a selected tab. With the application, a new control can be added to an existing tab, or a new tab can be created to arrange an arbitrary edit control therein in response to a user instruction.

Further, there exists an application in which a plurality of edit modes is shown in a single window and an edit screen which differs for each edit mode is switched over for display.

For example, there is a document editing application having a first edit mode for editing a document and a second edit mode for changing print settings. In the first edit mode for editing a document, one page of a document to be edited is displayed on a screen of an edit area so that contents of the displayed page of the document can be edited based on a user instruction. Further, in the second edit mode for changing print settings, a page of a document to be printed is displayed on a print preview screen so that the user can check the print state and change print settings such as a margin setting and sheet orientation. It is common for such an application including a plurality of edit modes to switch and display a UI as appropriate to each edit mode.

Further, in such an applications including a plurality of edit modes, there exists an edit command (edit control) that can be used only in a specific edit mode.

For example, in a case of using an edit command for changing print settings, if no print preview screen is displayed, it is difficult to visually recognize an item that has been changed. Thus, it is desirable to display an edit control for changing print settings only when a preview screen is displayed.

On the other hand, control for a function to add a drawing to a desired page in a document (e.g., a control for editing document contents such as an annotation function,) is desirably disabled while a print preview screen is displayed.

Meanwhile, in a case where the user is allowed to arbitrarily customize a control UI on a tab in an application including an edit command that can be used only in a specific edit mode and a shared command that can be used in a plurality of edit modes, the following issue arises.

For example, in a case where a plurality of controls for commands that are operable only in different modes from one another is arranged on the same tab, when an application is running in a certain mode, a control that is operable only in a different mode cannot be executed. In this case, in order to execute the command of the control that is operable only in the different mode, the user needs to actively change the mode.

SUMMARY

According to an aspect of the present invention, an information processing apparatus configured to execute an application including a plurality of user interfaces displaying information corresponding to a plurality of edit modes includes a management unit configured to store and manage information about controls arranged in each of the plurality of user interfaces displayed on a display, an acquisition unit configured to acquire an edit mode selected when customization of the plurality of user interfaces is instructed by a user, and acquire from the management unit control information about a control executable in the acquired edit mode, and an editing unit configured to, on a screen for customizing the plurality of user interfaces, display a list of the control information acquired by the acquisition unit, and receive from the user an instruction to edit the plurality of user interfaces.

Further features of the present disclosure will become apparent from the following description of exemplary embodiments with reference to the attached drawings.

BRIEF DESCRIPTION OF THE DRAWINGS

FIGS. 7A and 7B each illustrate a dialog to be displayed on a document editing application.

DESCRIPTION OF THE EMBODIMENTS

Figure 1:
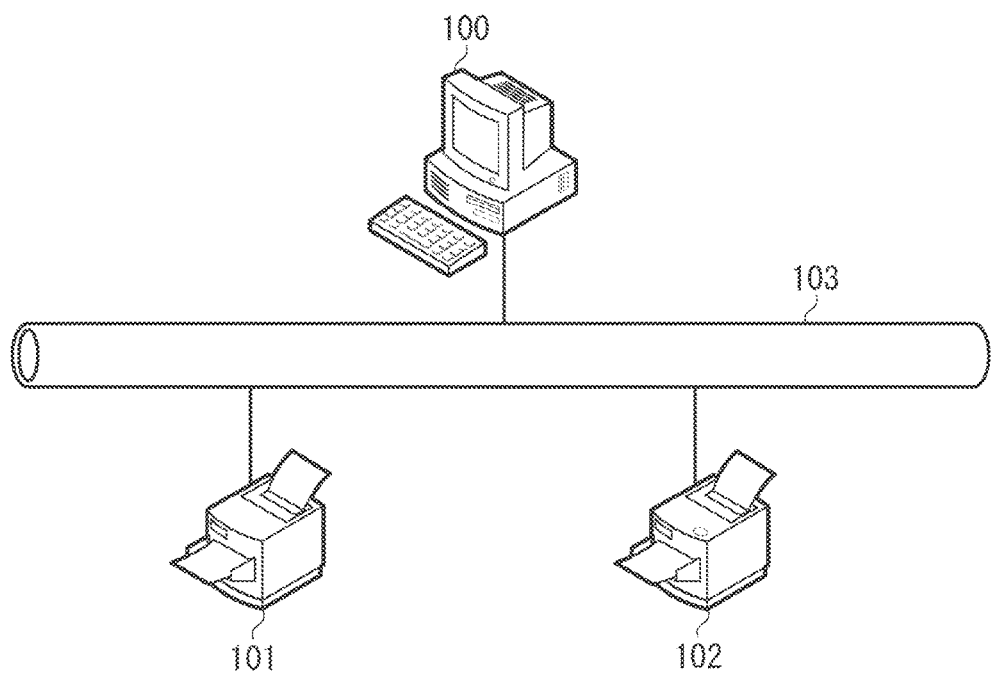
FIG. 1 illustrates a configuration of a data processing system.

The following describes a first exemplary embodiment. FIG. 1 illustrates a configuration of a data processing system according to the present exemplary embodiment. The present exemplary embodiment is a system in which an information processing apparatus described below and an image processing apparatus described below can communicate with each other via a network.

In FIG. 1, an information processing apparatus 100 is a personal computer (PC) used by a user to give a print instruction or a facsimile transmission instruction to image processing apparatuses 101 and 102. The information processing apparatuses 101 and 102 each include a printer function, a facsimile function, a copy function, a scanner function, and a file transmission function. A predetermined operating system (OS) and various types of applications (not illustrated) configured to execute specific function processing are installed in the information processing apparatus 100.

The specific function processing includes document processing, spreadsheet processing, presentation processing, image processing, and diagram processing, and each of the applications includes a unique data configuration (file configuration). Further, the OS is configured to refer to an identifier of each file and give a print instruction to a corresponding application.

Further, a document editing application 400 for using the image processing apparatuses 101 and 102 is installed in the information processing apparatus 100 according to the present exemplary embodiment. The document editing application 400 includes a function of giving an output instruction such as a print instruction and a facsimile transmission instruction to the image processing apparatuses 101 and 102, and also includes a function of displaying usage statuses of the image processing apparatuses 101 and 102 and execution status of an output job. The information processing apparatus 100 and the image processing apparatuses 101 and 102 are connected to a local area network (LAN) 103 and communicate with one another via the LAN 103 to transmit and receive information.

[Hardware Configuration (Information Processing Apparatus)]

Figure 2:
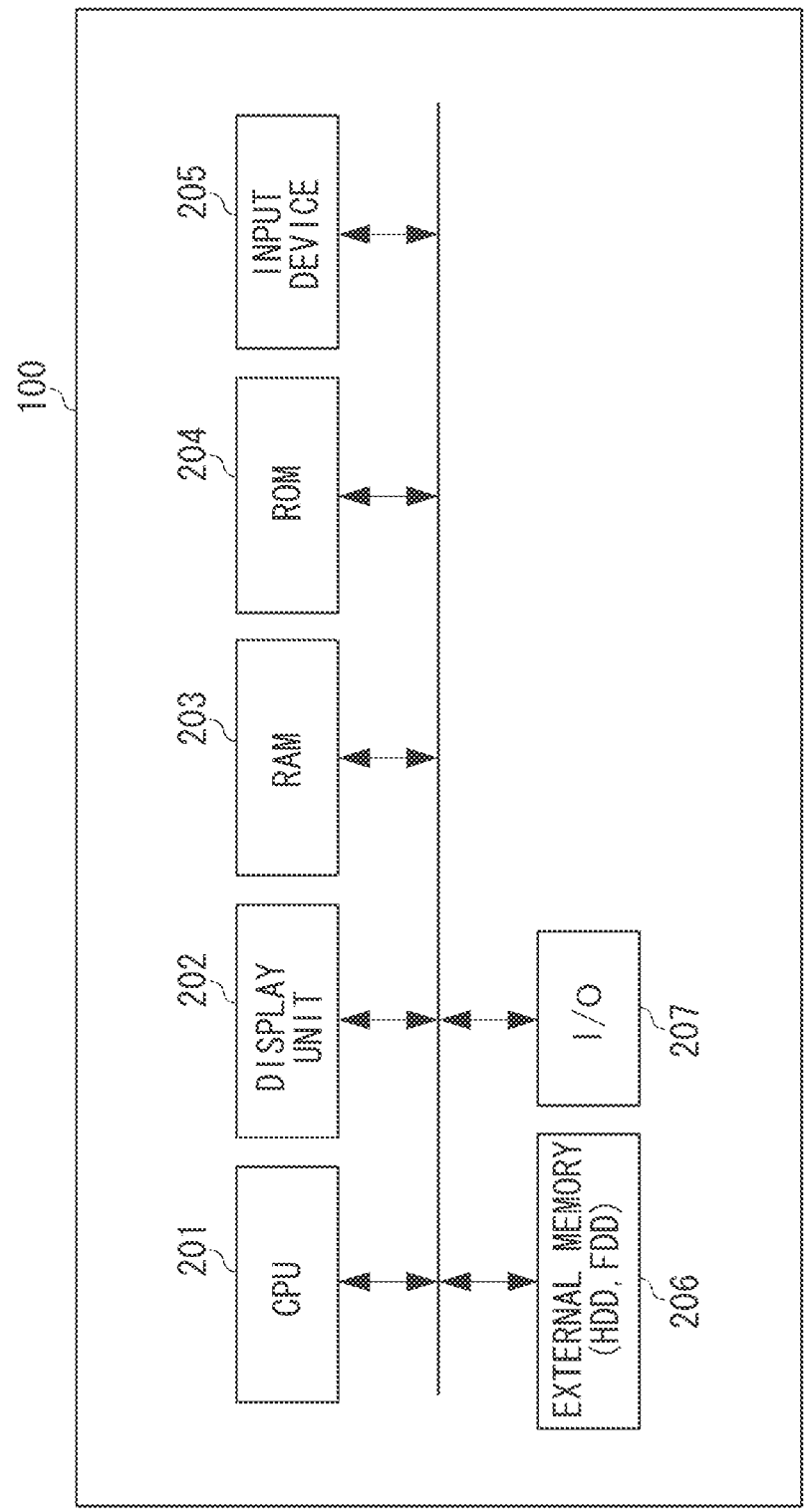
FIG. 2 illustrates a hardware configuration of an information processing apparatus.

FIG. 2 illustrates a hardware configuration of the information processing apparatus 100 illustrated in FIG. 1.

In FIG. 2, the information processing apparatus 100 includes an input device 205 such as a keyboard or pointing device for receiving user operation. Further, a display unit 202 for feeding back a visual output information to a user.

Further, the information processing apparatus 100 includes a random access memory (RAM) 203, which is a storage device for storing various types of programs and execution information according to the present exemplary embodiment, an external memory 206 such as a hard disk drive (HDD) or flexible disk drive (FDD), and a read-only memory (ROM) 204. Furthermore, an input/output (I/O) 207, which is an interface device for communicating with an external device, and a central processing unit (CPU) 201 for executing a computer program such as an application are included.

The connection to a peripheral device may be either one of wired and wireless connections. The information processing apparatus 100 is connected to the image processing apparatuses 101 and 102 via the I/O 207. A program stored in the ROM 204 is read into the RAM 203 and sequentially executed by the CPU 201 to realize processing described in the present exemplary embodiment.

[Hardware Configuration (Image Processing Apparatus)]

Figure 3:
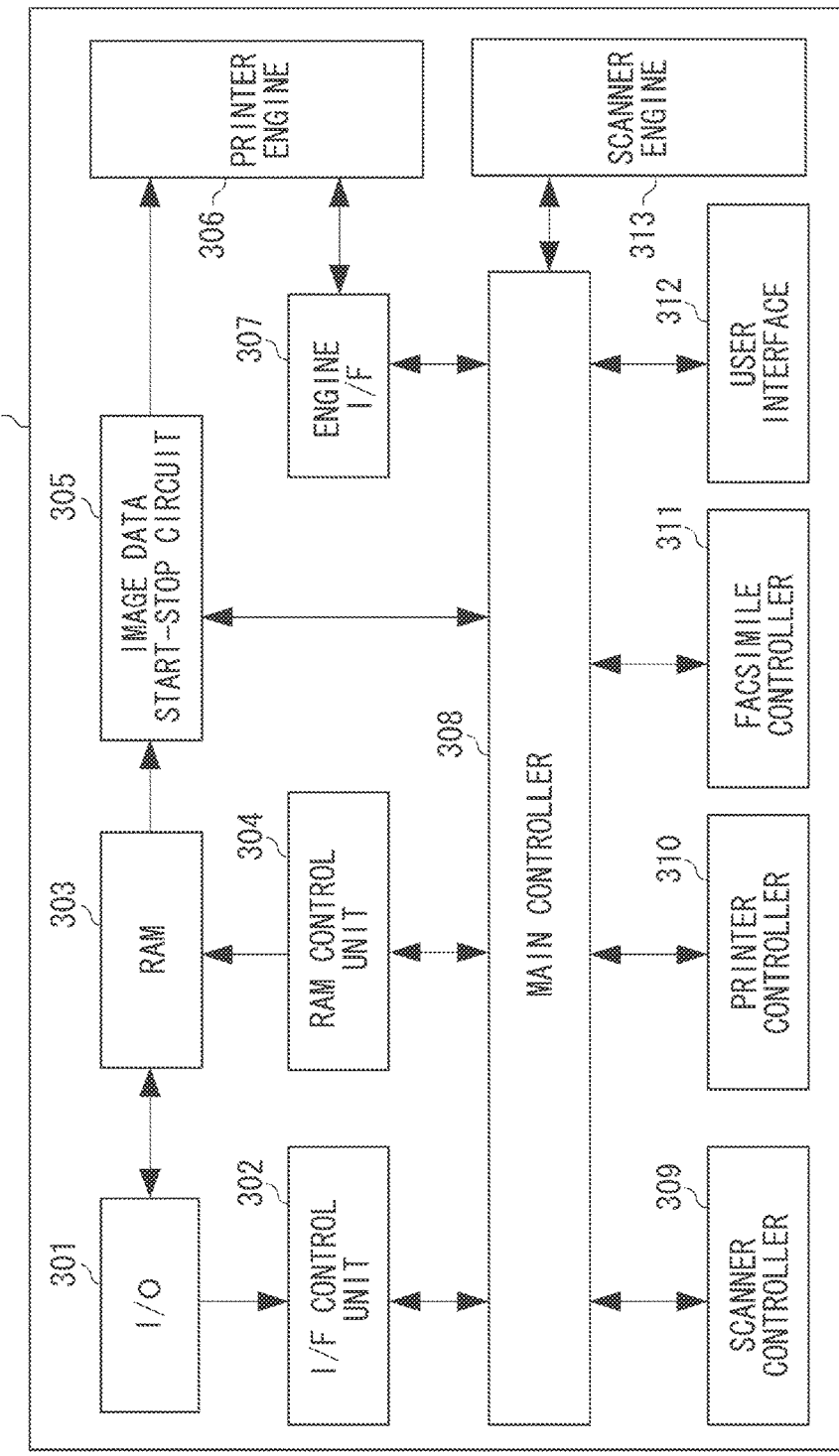
FIG. 3 is a block diagram illustrating a hardware configuration of an image processing apparatus.

FIG. 3 is a block diagram illustrating a hardware configuration of the image processing apparatuses 101 and 102 illustrated in FIG. 1.

In the present exemplary embodiment, a multi-function peripheral (MFP) including a scanner function, a printer function, and a facsimile function will be described as an example. In FIG. 3, an I/O 301 is connected to the information processing apparatus 100 via a communication medium such as the network (LAN) 103. A plurality of I/Os 301 may be included to allow a plurality of connection forms. The image processing apparatus 101 (102) passes a device identifier (ID) and a scan image to the information processing apparatus 100 via the I/O 301. Further, the image processing apparatus 101 (102) receives various types of control commands from the information processing apparatus 100 and performs processing.

An I/F control unit 302 performs control to issue a device ID for a processing system such as a scanner (not illustrated), a printer (not illustrated), or a facsimile (not illustrated) included in the image processing apparatus 101 (102). A RAM 303 is a primary storage device used to store external data such as a control command acquired by the I/O 301 and an image captured by a scanner engine 313. Further, the RAM 303 is used to store an image developed by a printer controller 310 before being passed to a printer engine 306, etc.

The allocation management of the RAM 303 is performed by a RAM control unit 304. An image data start-stop circuit 305 outputs, based on rotation of the printer engine 306, an image acquired by the printer controller 310 or the scanner engine 313 and then developed, to the RAM control unit 304. The printer engine 306 is a device configured to develop an image on an output medium such as a sheet.

A main controller 308 performs various types of control on the printer engine 306 via an engine I/F 307. Further, the main controller 308 is a key control module and performs processing to appropriately distribute control languages received from the information processing apparatus 100 via the I/O 301 to a scanner controller 309, the printer controller 310, and a facsimile controller 311. Further, the main controller 308 controls the printer engine 306 and the scanner engine 313 according to an instruction from each of the controllers and a user interface (UI) 312.

By unifying control interfaces between the main controller 308 and the respective controllers, an extension board capable of processing various types of control commands can be installed in a single peripheral device. Further, the main controller also has a role to acquire a device ID of a currently-installed extension controller from each controller and manage the acquired device IDs. The scanner controller 309 converts a scan control command received from the information processing apparatus 100 into an internal execution command interpretable by the main controller 308.

The scanner controller 309 further converts an image read by the scanner engine 313 into a scan control command. The printer controller 310 converts a page description language received from the information processing apparatus 100 into an internal execution command including a developed image of a page description language that is interpretable by the main controller 308. The developed image is conveyed to the printer engine 306 and printed on an output medium such as a sheet. The facsimile controller 311 develops a facsimile control language received from the information processing apparatus 100 into an image and transfers the image to another facsimile device or an Internet Protocol (IP)-facsimile via a public communication line (not illustrated) or the Internet.

The UI 312 is used as an user instruction input/output unit when various settings of the main controller 308 are executed, or when the scanner function, the printer function, and the facsimile function are executed directly on the image processing apparatus 101 or 102. The scanner engine 313 reads, based on an instruction from the main controller 308, an image printed by using an optical device, converts the image into electric signals, and transmits the electric signals to the main controller 308.

[Software Configuration Diagram]

Figure 4:
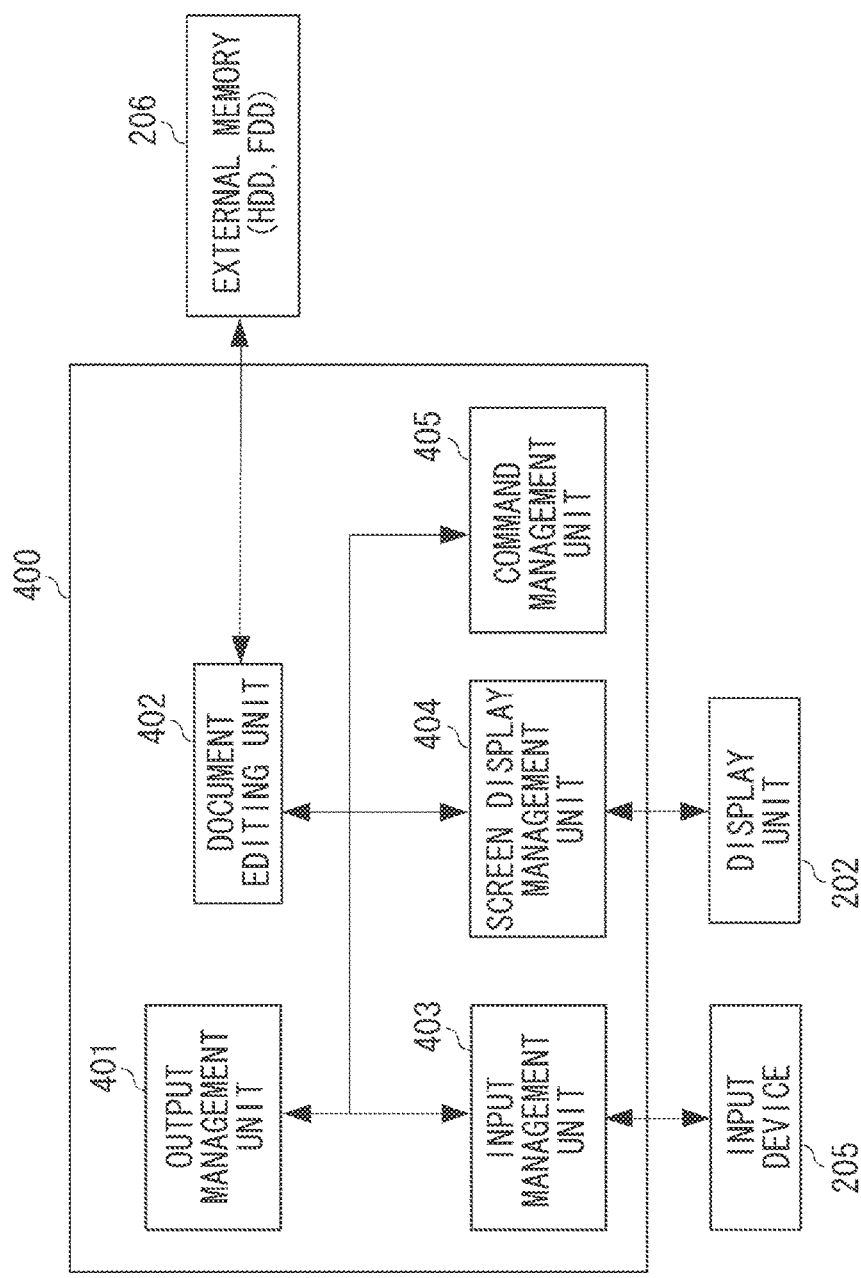
FIG. 4 illustrates an example of a function configuration of a document editing application.

FIG. 4 illustrates an example of a function configuration of an information processing apparatus. The information processing apparatus 100 illustrated in FIG. 1 executes the document editing application 400 to realize the function configuration. The document editing application 400 is an application program that is stored in the external memory 206 and is developed on the RAM 203 and the ROM 204 at the time of execution executed by the CPU 201.

In FIG. 4, the document editing application 400 includes a plurality of edit modes including an edit mode providing an annotation function for editing a page in a document, an edit mode for performing print settings on a document, etc. The document editing application 400 is a computer program causing the CPU 201 of the information processing apparatus 100 to function as an output management unit 401, a document editing unit 402, an input management unit 403, a screen display management unit 404, and a command management unit 405. The output management unit 401 outputs to the image processing apparatus 101 (102) a document edited and stored by the document editing unit 402. Specifically, the output processing includes printing on a sheet via the printer controller 310, facsimile transmission via the facsimile controller 311, etc.

The document editing unit 402 performs editing processing and saving processing on a document. While the editing processing in the present exemplary embodiment includes the annotation function to edit a page in a document and the print settings on a document, the exemplary embodiments are not limited to such processing. The input management unit 403 detects a user operation on the input device 205 via an UI of the document editing application 400 displayed by the screen display management unit 404 and acquires the user operation information.

Figure 5:
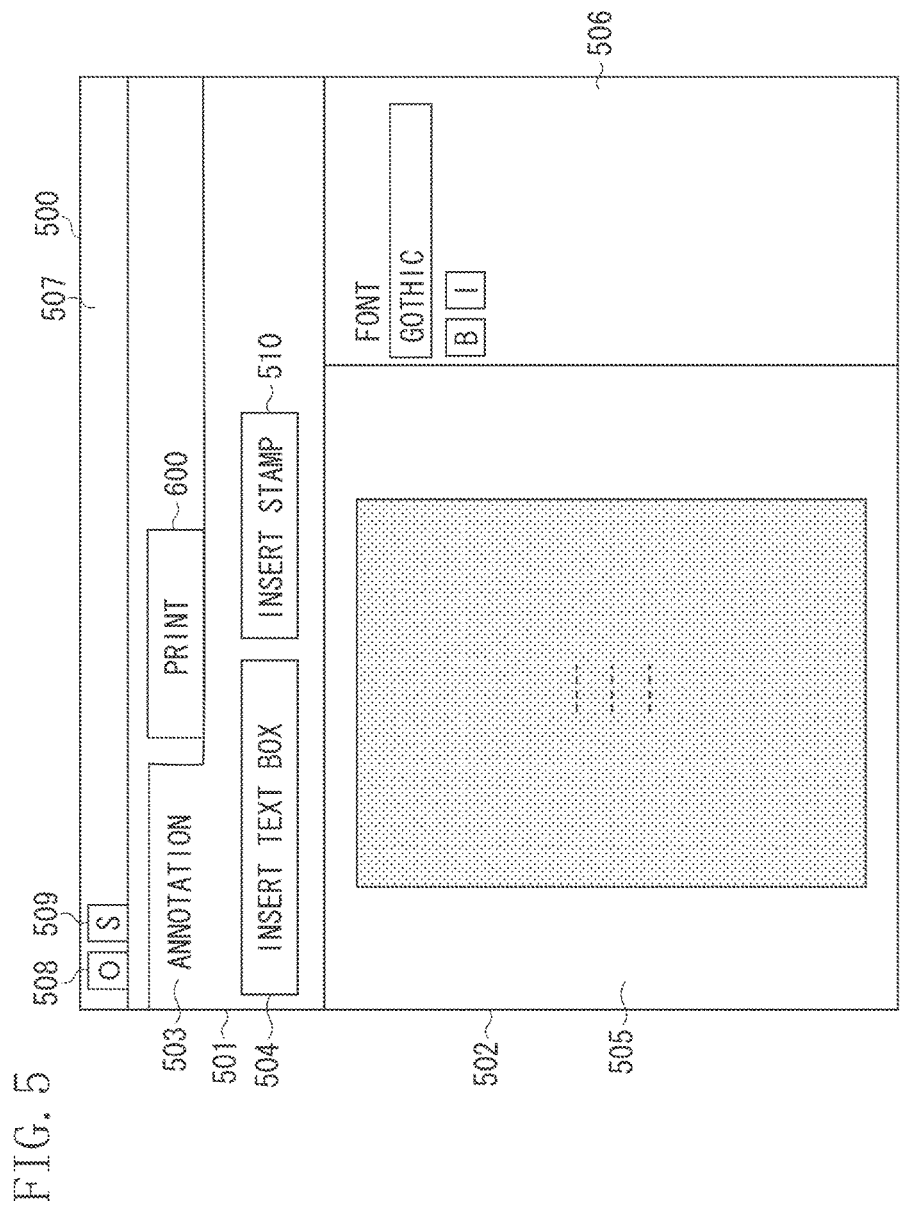
FIG. 5 schematically illustrates a display screen of a document editing application.

The screen display management unit 404 performs screen display control such as the display of a UI illustrated in FIG. 5 as an example of the UI of the document editing application 400. The command management unit 405 manages commands included in the document editing application 400. Command information is managed by the command management unit 405 as control information 920 illustrated in FIG. 9, which is described below. Specifically, the command management unit 405 stores the control information 920 in the RAM 203 and manages the control information 920.

[Document Editing Application Display Screen]

FIG. 5 schematically illustrates a display screen of the document editing application 400 illustrated in FIG. 4.

Figure 6:
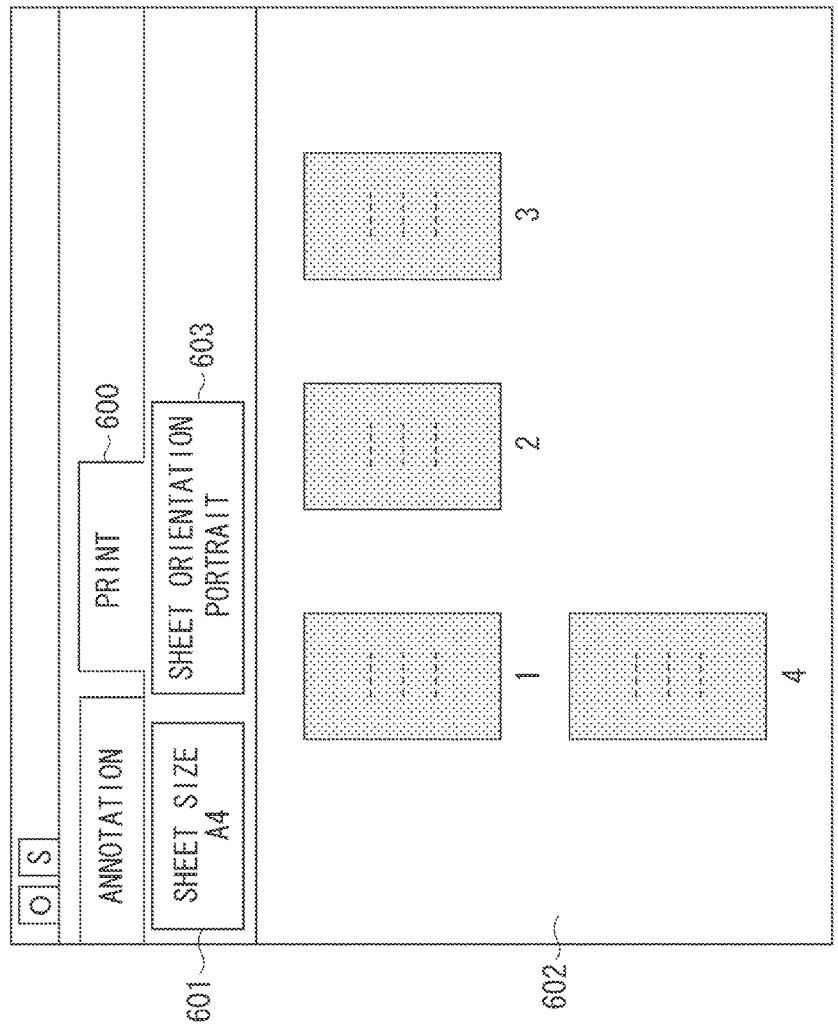
FIG. 6 schematically illustrates a display screen of a document editing application.

In FIG. 5, a UI 500 is a UI of a display screen displayed on the display unit 202. A tab list 501 includes a plurality of tabs (503, 600). In the example illustrated in FIG. 5, an annotation edit tab 503, which is currently selected, and a print tab 600 for switching to a screen illustrated in FIG. 6 are displayed. Further, edit controls (504, 510) arranged in a tab sheet corresponding to the selected tab 503 are displayed.

A work area 502 includes a document display area 505 for displaying document contents corresponding to an edit mode and a setting display area 506 for displaying a control for settings. Each tab existing in the tab list 501 holds an edit mode associated with the tab, and when an arbitrary tab is selected, the screen is updated to display a work area that is used in the edit mode held by the selected tab. Specifically, when a tab is selected, the display screen of the work area 502 is changed to a display form of a work area appropriate for an edit mode associated with the tab.

The foregoing does not apply to a case where an edit mode held by a previous tab that has been selected before the change and an edit mode held by a tab that is selected after the change are the same. Further, a tab including no edit mode to arrange a control including a shared command (e.g., save, etc.) may be provided so that the display of a necessary work area is not updated. In the present screen configuration example, the annotation edit tab 503 holds an annotation edit mode, and the print tab 600 holds a print setting edit mode.

In the annotation edit tab 503, a list of edit controls relating to an annotation edit command is arranged. An annotation is a drawing object to be added to a document page. In the example illustrated in FIG. 5, a text box insertion control 504 and a stamp insertion control 510 are arranged as edit controls. A text box insertion command and a stamp insertion command are associated with the annotation edit mode in advance and can be used only in the annotation edit mode.

When the user selects the text box insertion control 504, the text box insertion command is executed to insert a text box into a displayed page in a document to be edited. Further, when the user selects the stamp insertion control 510, the stamp insertion command is executed to insert a stamp into the displayed page.

In the document display area 505 of the annotation edit mode, a document is displayed page by page. When the text box insertion command is executed, a text box is inserted into the document displayed in the annotation edit mode, and the state of the page in which the text box is inserted is displayed. Further, the inserted text box can be selected and moved based on a user instruction.

In the setting display area 506 of the annotation edit mode, when an annotation (text box, stamp, etc.) inserted in the document display area 505 of the annotation edit mode is selected by the user, attribute information about the selected annotation, etc. is displayed. For example, when a text box annotation is selected, font information about the selected text box, etc. is displayed, and the font information can be changed via the setting display area 506.

A tool bar area 507 is displayed in the document editing application 400 regardless of the tab selection status and the edit mode. Controls arranged in the tool bar area 507 are always displayed so that the controls are always executable if the controls are in an executable state. In the screen example, a control having a function of an open (O) command 508 for opening a document and a control having a function of a save (S) command 509 for saving a document are arranged.

FIG. 6 schematically illustrates a display screen of the document editing application 400 illustrated in FIG. 4, showing a display state when a print tab 600 in the tab list 501 on the UI screen illustrated in FIG. 5 is selected by the user.

In FIG. 6, the print tab 600 is arranged, and edit controls (controls 601 and 603 relating to the print setting command) arranged in a tab sheet corresponding to the selected print tab 600 are displayed. The example illustrated in FIG. 6 shows the state in which a sheet size setting control 601 and a sheet orientation setting control 603 are arranged. A sheet size setting command and a sheet orientation setting command are associated in advance with the print setting edit mode and can be used only in the print setting edit mode.

When a sheet size setting control 601 is selected by the user, the sheet size setting command is executed, and the sheet size to be used in printing a document can be changed based on a user instruction.

In a document display area 602 of the print setting edit mode, a preview of a print result is displayed. When the sheet size setting command is executed, a preview of a print result of a case where the sheet size has been changed is displayed.

Further, when the sheet orientation setting control 603 is selected by the user, the sheet orientation setting command is executed, and the sheet orientation can be changed to either a portrait orientation or a landscape orientation based on a user instruction.

[UI Customization Setting Dialog]

Figure 7B:
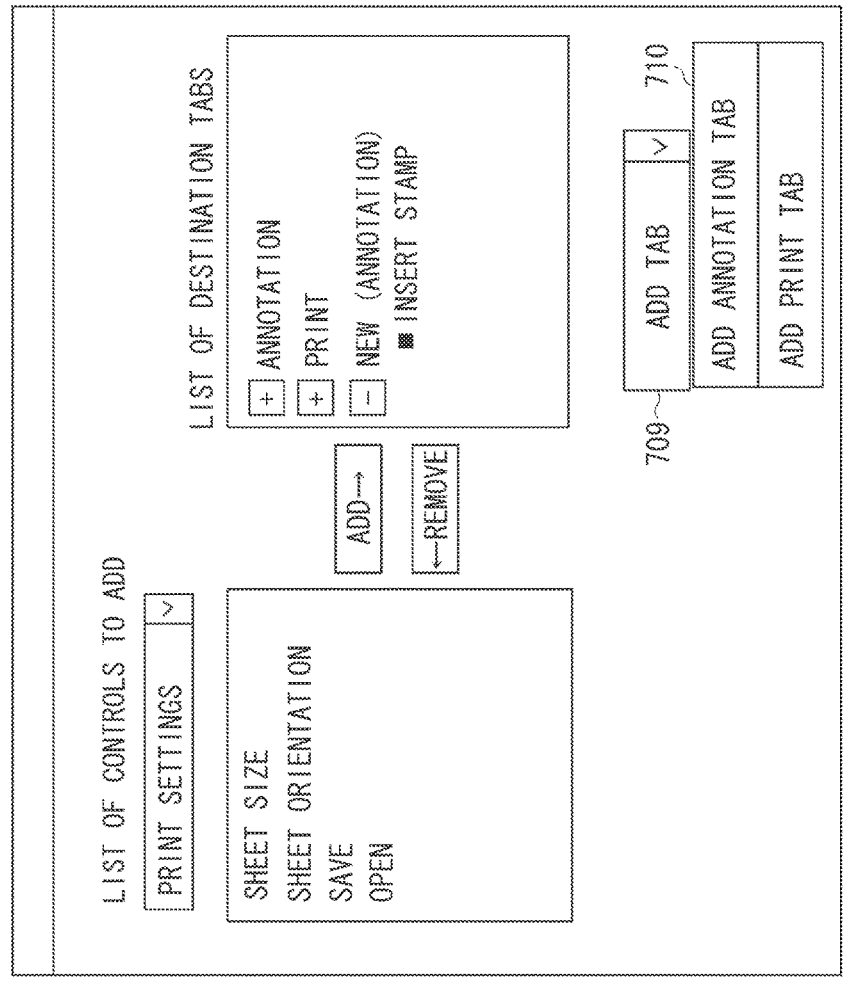

FIGS. 7A and 7B each illustrate a display example of a dialog for customizing (editing) the UI of the document editing application 400 illustrated in FIG. 4. A tab customization instruction (instruction to edit controls to be displayed on the tab sheet) is received from the user via the customization dialog.

In FIGS. 7A and 7B, an edit command can be added to or removed from a tab selected from the tab list 501 via a UI customization setting dialog 700. When an edit command is added, an edit control (button, list, etc.) corresponding to the edit command is displayed on the tab.

A command list 701 is a list of commands that can be added, showing a list of edit commands included in the document editing application 400. A mode 708 indicates a currently-selected mode, and edit commands that belong to the selected mode and commands that can be commonly used in a plurality of modes are displayed in the command list 701.

In FIG. 7A, the annotation mode is currently selected in the mode 708, and at this time, "Insert text box" and "Insert stamp" commands, which are specific to the annotation edit mode, and "Save" and "Open" commands, which are shared commands, are displayed in the command list 701.

In FIG. 7B, the print setting edit mode is currently selected in the mode 708, and "sheet size" and "sheet orientation" setting commands, which are specific to the print setting edit mode, and "Save" and "Open" commands, which are shared commands, are displayed in the command list 701. When the selected mode 708 is changed by a user instruction, the command list 701 is changed to a command list corresponding to the changed mode.

A destination tab list 702 shows a list of tabs displayed in the tab display area 501. Further, a new tab can be added to the destination tab list 702, and the added new tab is also displayed. Further, depending on the function of the document editing application 400, a tab may be displayed only in a specific state. In this case, tabs other than the tabs displayed in the tab display area 501 may be displayed in the destination tab list 702. The destination tab list 702 is displayed in tree structure. As to the display state of the tree, the tree can be opened/closed by a user operation.

In the examples illustrated in FIGS. 7A and 7B, the tree of the new (annotation) tab is opened, and the "Insert stamp" command is arranged in the new (annotation) tab. When a tab displayed in the tab list 702 is selected to be added as a destination tab, the currently selected mode 708 described above may be changed to the mode associated with the selected tab.

A command addition button 703 is used to add a command. The user selects an arbitrary command that can be added from the command list 701, and selects a tab as a destination from the destination tab list 702. In this state, if the command addition button 703 is pressed by the user, the selected command is added.

A command removal button 704 is used to remove a command. If a command is selected from the destination tab list 702 by a user operation and then the command removal button 704 is pressed, the command selected in the destination tab list 702 is removed from the tab to which the command belongs.

A tab addition button 705 is used to add a tab. When the tab addition button 705 is pressed by the user, a new tab is added to the destination tab list 702. At this time, the mode associated with the added tab is the currently-selected mode 708. When a new tab is added, the newly added tab is also displayed in the tab list 501 in the document editing application 400. An OK button 706 is used to apply addition/removal of a command, addition of a tab, etc. set in the UI customization setting dialog 700.

A cancellation button 707 is used to return to the previous state before the dialog is opened without applying addition/removal of the command, addition of a tab, etc. set in the UI customization setting dialog 700.

A control 710 is displayed when a drop-down portion 709 of the tab addition button 705 is selected. The user uses the control 710 to designate a mode to be associated with a new tab to be added regardless of the currently selected mode 708. In the example of the control 710, a tab related to the annotation edit mode or a tab related to the print setting edit mode can be selected and newly added.

Figure 8:
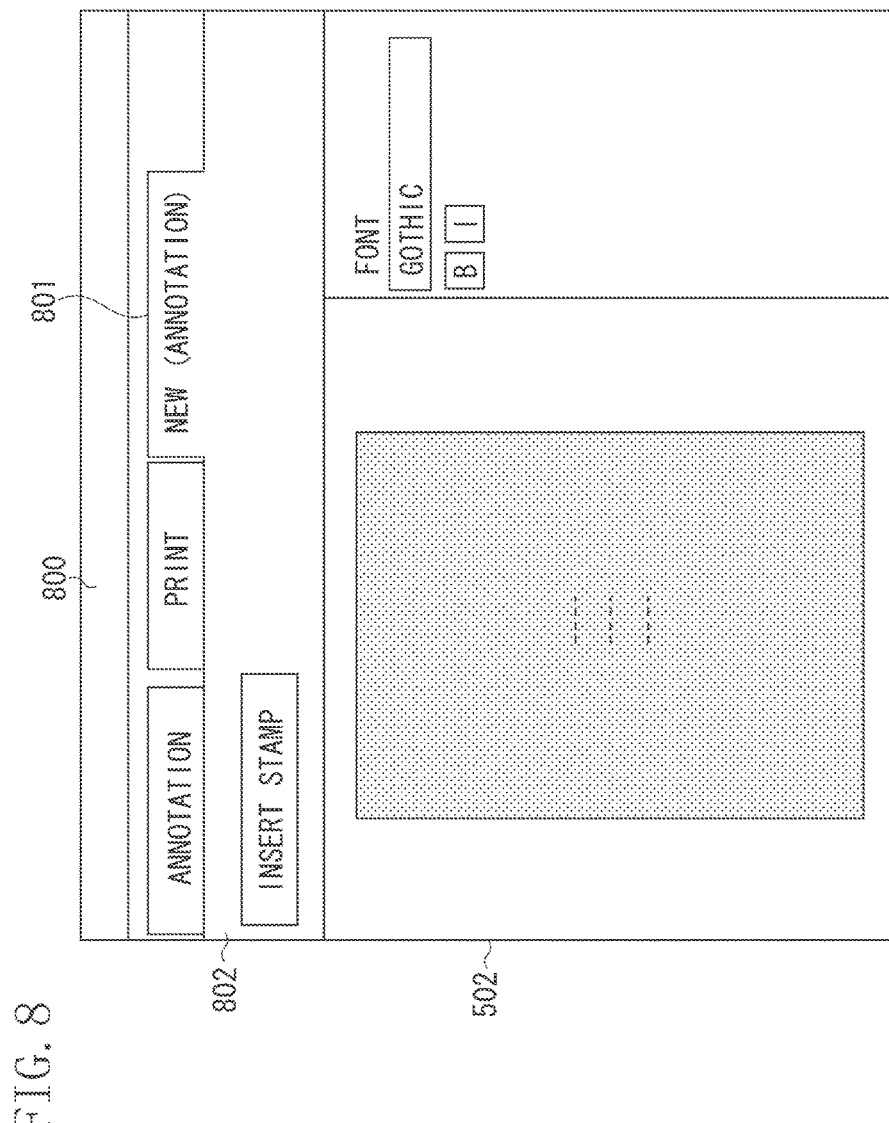
FIG. 8 schematically illustrates a display screen of a document editing application.

FIG. 8 schematically illustrates a display screen of the document editing application 400 illustrated in FIG. 4.

In FIG. 8, a UI 800 is a configuration example of a UI to which a new (annotation) tab has been added. A tab 801 is associated with the annotation edit mode. When the tab 801 is selected, similarly to the case where the annotation edit tab 503 is selected, the work area 502 is updated to the display screen of the annotation edit mode. In an area 802, the "stamp insertion command" control set in the destination tab list 702 in FIG. 7A is arranged.

Figure 9:
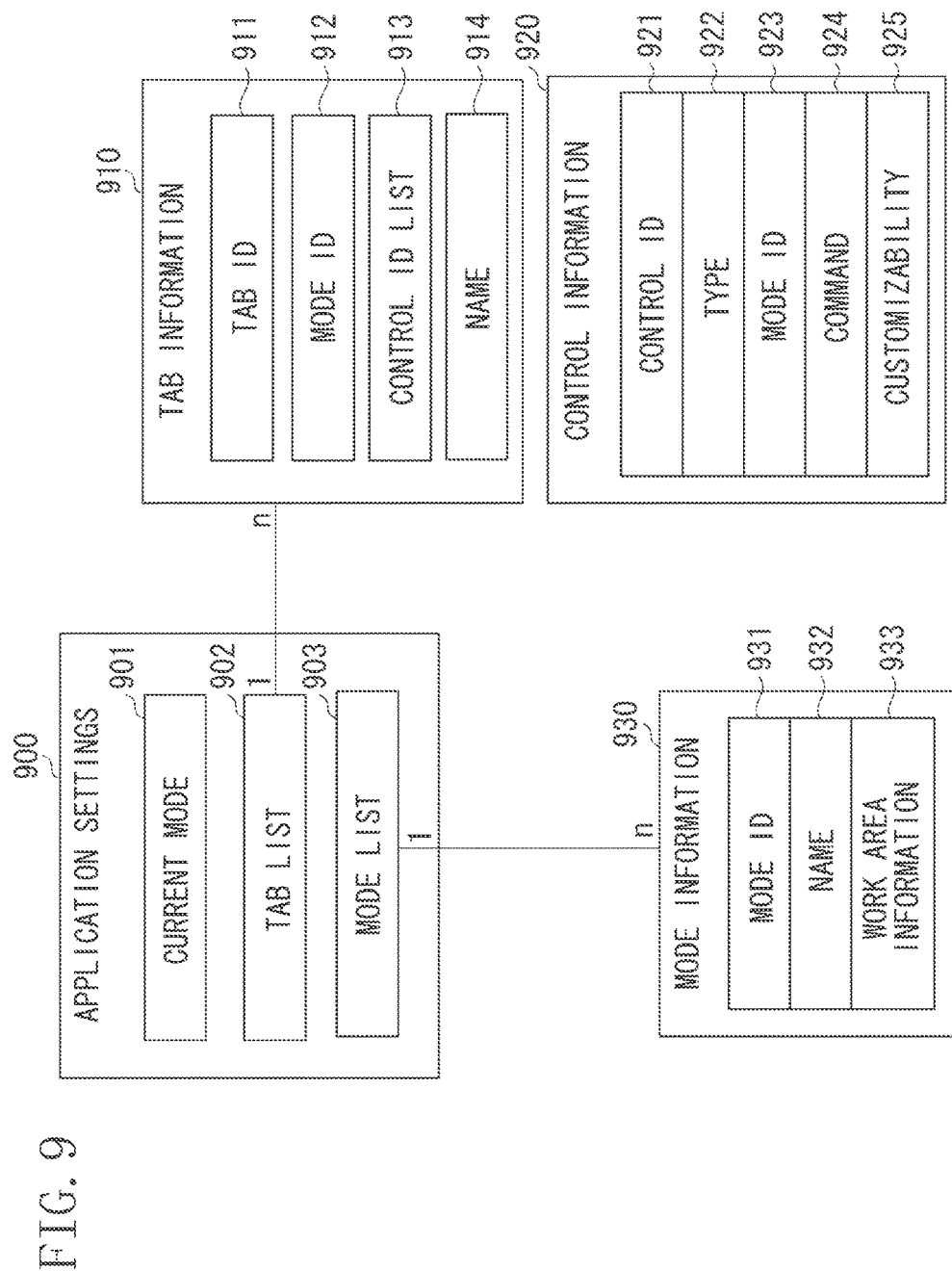
FIG. 9 illustrates a configuration of information managed as display control information.

FIG. 9 illustrates a configuration of information managed as display control information in the information processing apparatus according to the present exemplary embodiment. This configuration illustrates an example of data related to UI customization and the display of a customized UI.

In FIG. 9, application settings 900 are setting values of the entire application that are included in the document editing application 400. A current mode 901 stores a mode in which the document editing application 400 is operating during the operation of the document editing application 400. A tab list 902 stores a list of information about tabs displayed on the UIs illustrated in FIGS. 5 and 6. By referring to the information, the screen display management unit 404 arranges tabs and controls on the tabs.

The tab list 902 includes a single or a plurality of pieces of tab information 910. A tab ID 911 is a unique tab ID for identifying a tab. A mode ID 912 corresponds to a mode ID 931 of mode information 930 described below. A control ID list 913 stores a list of control IDs 921 of the control information 920 arranged on the tab. A name 914 is a tab name.

A mode list 903 stores a list of information about modes included in the document editing application 400. The mode list 903 includes a single or a plurality of pieces of mode information 930. The mode ID 931 is a unique ID for identifying the mode. A name 932 is a mode name.

Work area information 933 stores information required to configure the UI of the work area 502, that is necessary for the mode to operate. Based on the work area information 933, the screen display management unit 404 updates the display contents of the work area 502 when the mode is changed by switching the tab, etc.

The control information 920 serves as information for arranging an edit command as a control on a tab, and the number of pieces of control information 920 is identical to the number of commands included in the document editing application 400. The control ID 921 is a unique ID for identifying the control. A type 922 stores information about the type of the control (e.g., button).

A mode ID 923 stores an ID of a mode in which the control is operable. In a case of a shared command that can be used in any mode, a special mode such as "ALL" may be stored, or all the modes may be held. A command 924 stores reference information to a command related to the control (e.g., addition of annotation, etc.). Customizability 925 stores information about whether the control can be arranged in an arbitrary tab or tool bar area by customization.

[Flow of Process Performed to Display Customization Dialog]

Figure 10:
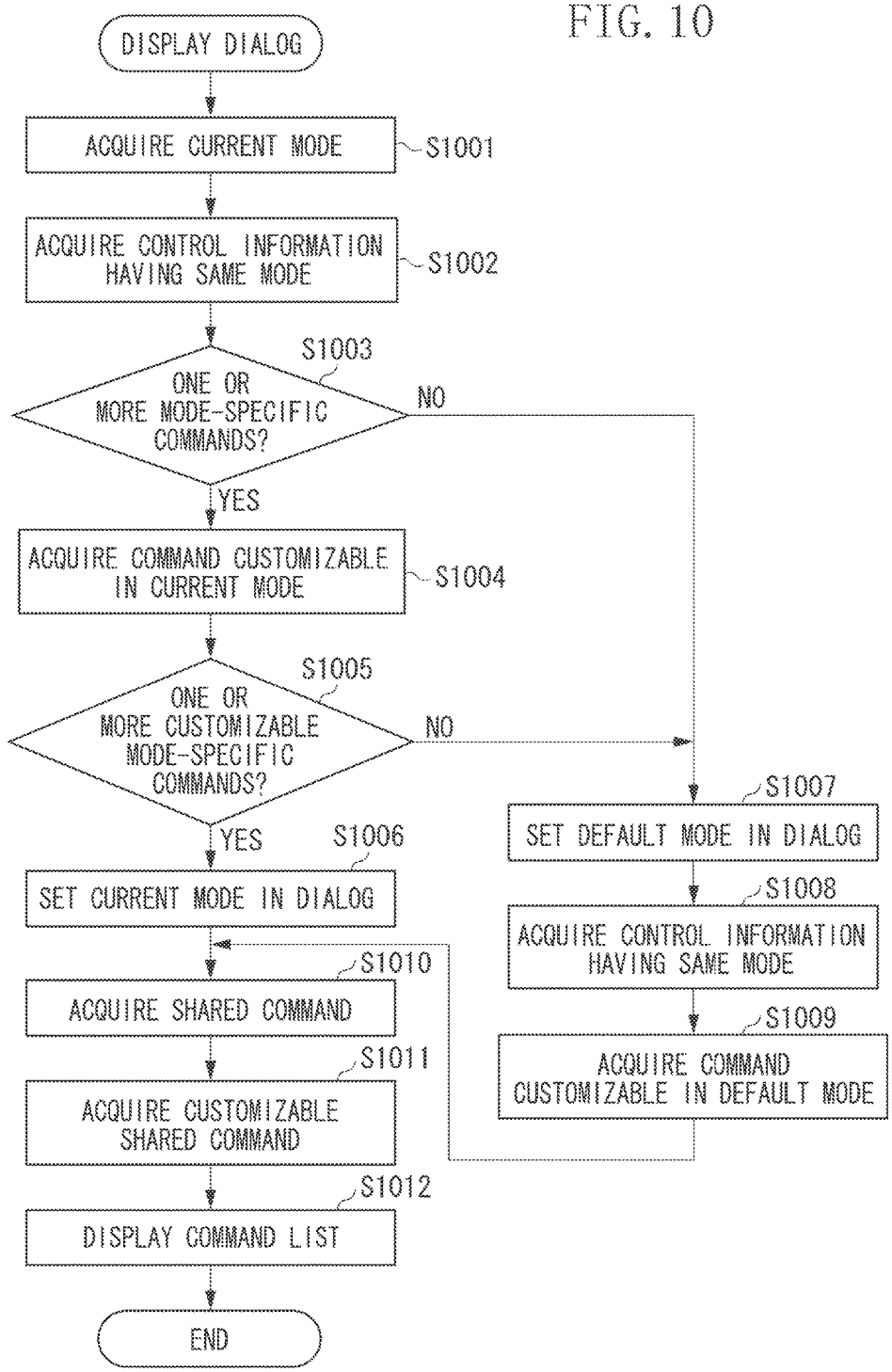
FIG. 10 is a flow chart illustrating a method of controlling an information processing apparatus.

FIG. 10 is a flow chart illustrating a method of controlling an information processing apparatus according to the present exemplary embodiment. This example corresponds to an example of a process performed to display a customization dialog. The CPU 201 of the information processing apparatus 100 illustrated in FIG. 2 executes the control program (modules illustrated in FIG. 4) stored in the external memory 206 to realize each step of the flow chart. The following describes details of the process using the modules illustrated in FIG. 4 as a subject.

The process flow is started when a control (not illustrated) for displaying the customization dialog 700 is pressed by the user and the input management unit 403 receives a notification. Specifically, when customization of a control arranged in a tab (customization of a user interface) is instructed by the user, the input management unit 403 provides a notification to the screen display management unit 404 and requests generation and display of the customization dialog 700 illustrated in FIG. 7A or 7B.

In step S1001, the screen display management unit 404, after receiving the request to generate the customization dialog 700, refers to the currently-selected mode 901 and acquires a current mode. Then, in step S1002, the screen display management unit 404 requests the command management unit 405 to refer to the mode IDs 923 of the control information 920, compares the mode IDs 923 with the current mode, and acquires the control information 920 having the same mode as the current mode.

Then, in step S1003, the screen display management unit 404 determines whether one or more mode-specific commands exist based on whether one or more pieces of control information exist. If the screen display management unit 404 determines that a mode-specific command exists (YES in step S1003), the processing proceeds to step S1004. In step S1004, the screen display management unit 404 refers to the customizability 925 of the control information 920 acquired by the screen display management unit 404 and acquires a command that is customizable in the current mode.

In step S1005, the screen display management unit 404 determines whether one or more customizable commands specific to the current mode exist based on whether, for example, one or more pieces of control information exist. If the screen display management unit 404 determines that one or more customizable mode-specific commands exist (YES in step S1005), the processing proceeds to step S1006. On the other hand, if the screen display management unit 404 determines that no customizable mode-specific command exists (NO in step S1005), the processing proceeds to step S1007.

While according to an aspect of the present invention, the determination is made depending on whether a customizable mode-specific command exists for each control in the present exemplary embodiment, an operation to determine customizability for each mode may be adopted. In this case, the customizability information exists in the mode information.

In step S1006, the screen display management unit 404 sets the mode acquired in step S1001 to the current mode 708 on the customization dialog 700. At this time, among the plurality of tabs displayed in the "destination tab list" 702 on the customization dialog 700, the tab selected when the control for displaying the customization dialog 700 was pressed by the user may be put into a selected state.

Next, in step S1010, the screen display management unit 404 requests the command management unit 405 to acquire a command that can be used in a plurality of modes, i.e., a shared command that can be used in a mode other than the selected edit mode. In step S1011, the screen display management unit 404 refers to the customizability 925 of the control information 920 acquired in step S1010 and acquires a customizable shared command. In step S1012, the screen display management unit 404 displays in the command list 701 the customizable commands acquired in steps S1004 and S1011, and displays in the selected mode 708 the customization dialog in a state where the mode set in step S1006 is selected. Then, the process is ended.

In this way, the customization dialog is displayed in a state where the commands that can be used in the mode selected when customization is instructed by the user are displayed in the command list 701. This decreases possibility that the user erroneously sets, in a tab sheet associated with a certain mode, a control that can be used only in a mode different from the specific mode.

On the other hand, in step S1007, the screen display management unit 404 sets a default mode in the customization dialog 700.

In the present exemplary embodiment, the default mode may be uniquely held in the document editing application 400 or in the customization dialog 700. In step S1008, the screen display management unit 404 requests the command management unit 405 to refer to the mode IDs 923 of the control information 920 to compare the mode IDs 923 with the default mode and acquires control information having the same mode as the default mode. In step S1009, the screen display management unit 404 refers to the customizability 925 of the control information 920 acquired in step S1008 and acquires a command that is customizable in the default mode. Then, in steps S1010 and S1011, a customizable shared command is acquired in the same manner as described above. In step S1012, the customizable commands acquired in steps S1009 and S1011 are displayed in the command list 701, and the customization dialog is displayed in the selected mode 708 in a state where the default mode set in step S1007 is selected. Then, the process is ended.

[Flow of Process Performed to Add New Tab]

Figure 11:
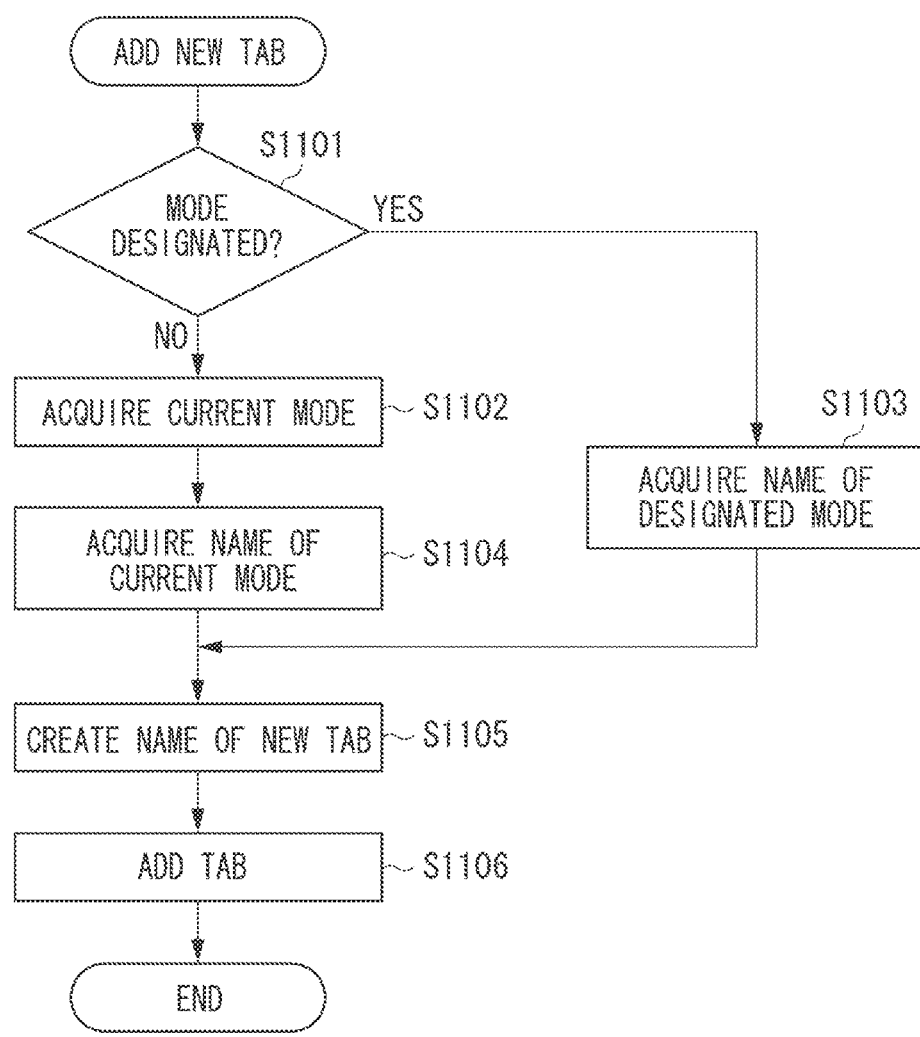
FIG. 11 is a flow chart illustrating a method of controlling an information processing apparatus.

FIG. 11 is a flow chart illustrating a method of controlling an information processing apparatus according to the present exemplary embodiment. This example corresponds to an example of a process performed to add a new tab. The CPU 201 of the information processing apparatus 100 illustrated in FIG. 2 executes the control program (modules illustrated in FIG. 4) stored in the external memory 206 to realize each step of the flow chart. The following describes details of the process using the modules illustrated in FIG. 4 as a subject.

The process flow is started when either the tab addition button 705 or the control 710 illustrated in FIG. 7A or 7B is pressed by a user.

In step S1101, the screen display management unit 404 determines whether a mode of a tab to be added is designated. Specifically, if the screen display management unit 404 determines that addition of the tab is executed with designation of the mode by the control 710 (YES in step S1101), the processing proceeds to step S1103. On the other hand, if addition of the tab is executed using the addition button 705 without designation of the mode (NO in step S1101), the processing proceeds to step S1102.

In step S1102, the screen display management unit 404 acquires the current mode set in the customization dialog 700. In step S1103, the screen display management unit 404 refers to the name 932 to acquire the name of the mode designated by the control 710. In step S1104, the screen display management unit 404 refers to the name 932 to acquire the name of the current mode acquired in step S1102.

In step S1105, the screen display management unit 404 creates a name of the new tab. At this time, the screen display management unit 404 creates the name based on the mode name acquired in step S1103 or S1104. For example, "new (annotation)," "new (print setting)," or the like may be used. Further, the tab name may be designated by the user. In step S1106, the tab name created in step S1105 and the tab associated with the mode acquired in step S1102 or step S1103 are added, and the process is ended.

According to the first exemplary embodiment, in an application including an edit command that can be used only in a specific edit mode and a shared command that can be used in a plurality of modes, only the commands that can be used in a mode associated with a tab are listed so that the user can set with ease a control of a command appropriate for the tab.

As the foregoing describes, according to the present exemplary embodiment, it is easy to provide a tab with a function to switch a screen edit mode simultaneously with the selection of the tab, and to arrange on each tab only a control operable in the same mode or a shared control executable in a plurality of modes.

Specifically, according to the present exemplary embodiment, in an application including a plurality of user interfaces (a plurality of tabs) each displaying information corresponding to each of a plurality of edit modes, a user, when customizing controls, can easily understand which command (control) is operable in which mode, and a control of a necessary function can be arranged correctly in a tab corresponding to the edit mode.

The following describes a second exemplary embodiment. The second exemplary embodiment is different from the first exemplary embodiment in that a control is arranged in an area (tool bar) where a destination of a command to be added is independent of a mode.

The tool bar displayed on the display unit 202 of the information processing apparatus 100 is always displayed regardless of the state of the tab and the current mode. Thus, there may be a case where a control having a command different from the current mode is arranged. This causes a problem that a target control (command) cannot be executed when the modes are not the same.

The second exemplary embodiment will describe how the foregoing problem can be solved, with reference to the drawings. Further, description of points that are similar to those in the first exemplary embodiment is omitted.

Figure 12:
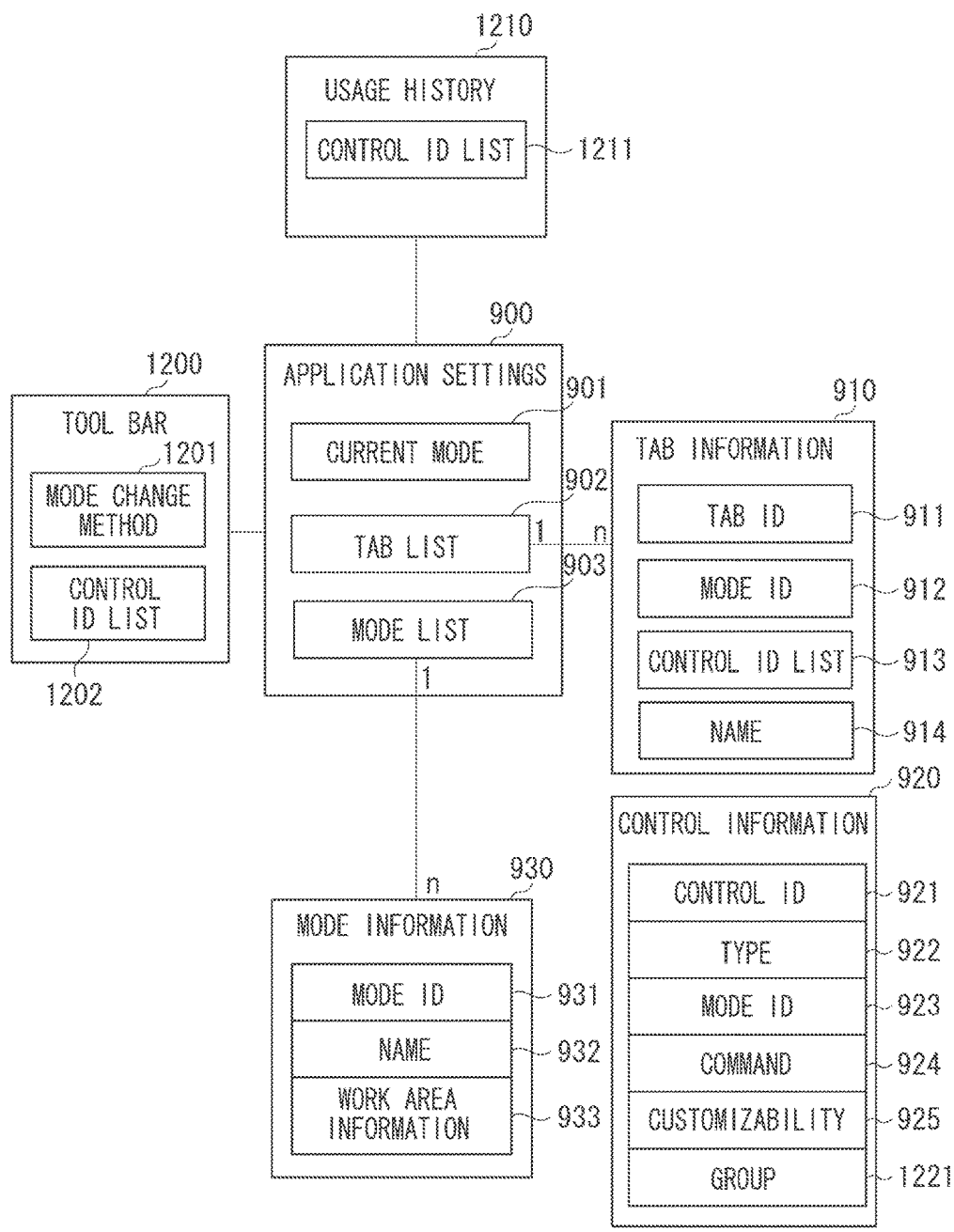
FIG. 12 illustrates a configuration of information managed as display control information.

FIG. 12 illustrates a configuration of information managed as display control information in the information processing apparatus according to the present exemplary embodiment. The following describes an example of data related to the display of a UI according to the present exemplary embodiment.

In FIG. 12, tool bar information 1200 is included. Based on the tool bar information 1200, the screen display management unit 404 arranges controls on the tool bar. A mode change method 1201 stores a method for changing a mode. The mode change method 1201 includes information about whether to automatically change the current mode 901 and the work area 502 necessary for the current mode 901 when the control is operated. A control ID list 1202 is a ID list of controls arranged on the tool bar. Control information 920 arranged on one or more tool bars is included.

A usage history 1210 is a history of commands executed in the document editing application 400. The command 924 of the control information 920 is executed so that the control ID 921 is stored in the control ID list 1211.

A group 1221 holds a group to which the control (command) belongs. As used herein, the group refers to an arbitrarily determined category. For example, a specific usage method is considered, and commands that are suitable to be used together may be grouped. More specifically, document review, generation of printed product, facsimile transmission, etc. may be grouped together.

Figure 13:
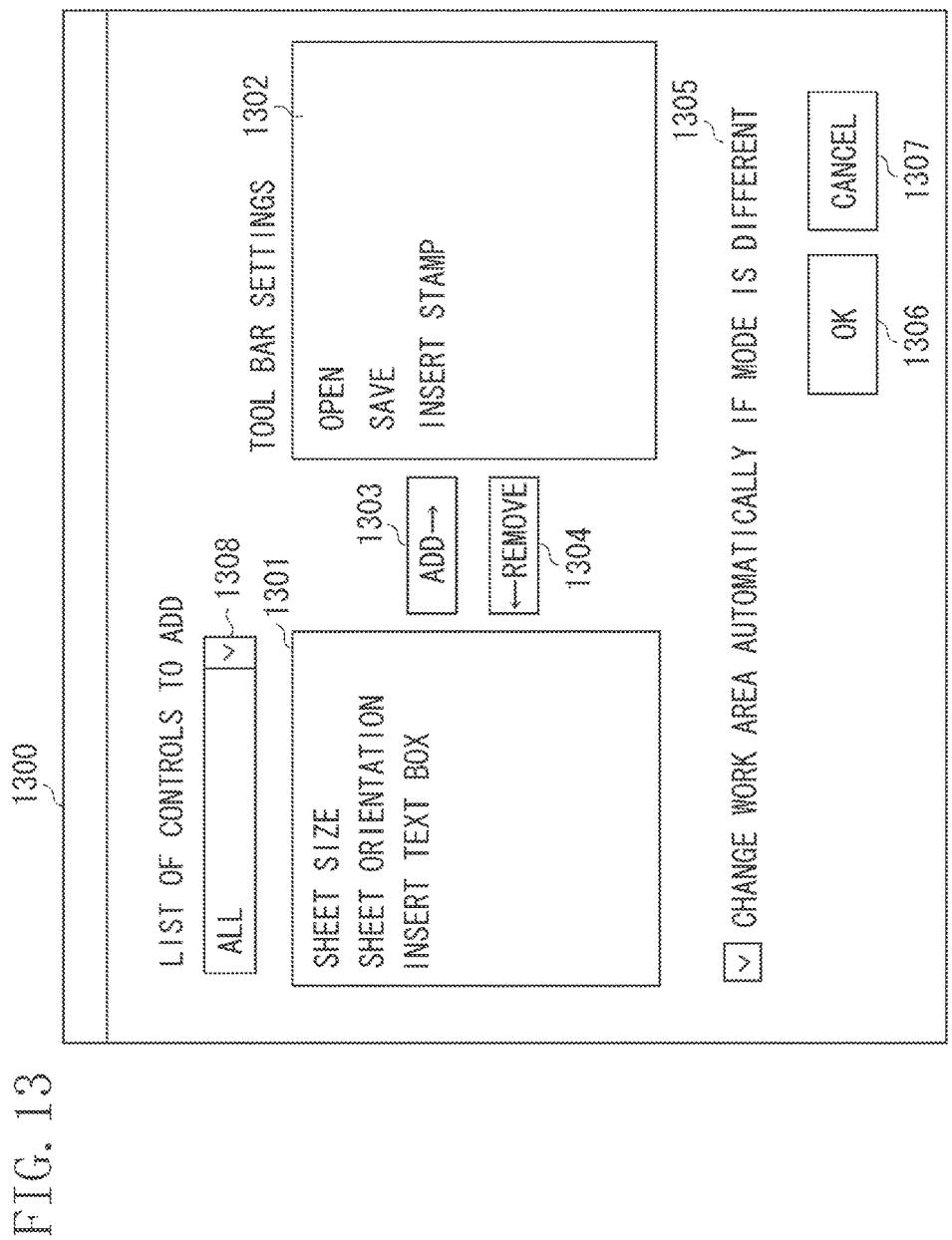
FIG. 13 illustrates a dialog to be displayed in a document editing application.

FIG. 13 illustrates an example of the display of a dialog for executing customization of a UI of the document editing application 400 illustrated in FIG. 4. The UI screen corresponds to the screen for editing the list of controls to be added.

In FIG. 13, a tool bar setting dialog 1300 is illustrated. In the tool bar setting dialog 1300, an edit command is added to the tool bar 507. When the edit command is added, an edit control corresponding to the edit command is displayed in the tool bar in which the control is to be arranged.

A command list 1301 is a list of commands to be added. The command list 1301 shows a list of edit commands included in the document editing application 400. Information about a list of controls having commands is similar to that in a UI customization dialog 1400, and a customizable mode-specific command displayed from the control information 920 and shared commands are displayed. A mode 1308 indicates a selected mode, and an edit command belonging to the selected mode and a command that can be used in common are displayed in the command list 1301. A tool bar list 1302 is a list of controls displayed in the tool bar 507 and is structured based on the control ID list 1202.

A command addition button 1303 is used to add a command. The user selects an arbitrary command to be added from the command list 1301. In this state, if the command addition button 1303 is pressed, the selected command is added.

A command removal button 1304 is used to remove a command. The user selects a command from the tool bar list 1302. In this state, if the command removal button 1304 is pressed, the selected command is removed from the tool bar list 1302.

A control 1305 is used to determine whether to automatically change the current mode 901 and the work area 502 when the command registered in the tool bar is executed. After the control is registered in the tool bar, the display of the control and the operation to be performed when the control is pressed are set by the control 1305 and determined by the mode change method 1201. In a case where the mode change method is set not to perform an automatic switch, if the registered control holds a mode that is different from the current mode 901, the control is handled to be in a disabled state.

On the other hand, in a case where the mode change method is set to perform an automatic switch, the control is handled to be in an enabled state. Then, when the control is pressed, the screen display management unit 404 changes the current mode 901 to the mode held by the control, updates the work area 502, and executes the command. Alternatively, in the case where the mode held by the registered control is different from the current mode 901, only the current mode and the work area 502 may be changed when the control is pressed.

An OK button 1306 is used to apply addition/removal of a command set in the tool bar setting dialog 1300.

A cancellation button 1307 is used to return to the previous state before the dialog is opened without applying the addition/removal of the command set in the tool bar setting dialog 1300.

According to the second exemplary embodiment, it is possible to generate a UI including a tool bar with a combination of functions desired by the user.

The following describes a third exemplary embodiment. The present exemplary embodiment is different from the first and second exemplary embodiments in that a current mode 708 of a UI customization dialog 1400 holds a filtering method other than the mode style, so that filtering can be performed. Further, a method of displaying a list of commands to be added to the command list 701 and information to be displayed are also different.

When the document editing application 400 holds a large number of commands, a large number commands are displayed in the command list 701. This may make it difficult for the user to find a command to be added to a tab.

The tool bar is always displayed regardless of the state of the tab and the current mode. Thus, there may be a case where a control having a command different from the current mode is arranged. This causes a problem that a target control (command) cannot be executed when the modes are not the same.

The third exemplary embodiment will describe how the foregoing problem can be solved, with reference to the drawings. Further, description of points that are similar to those in the first and second exemplary embodiments is omitted.

Figure 14:
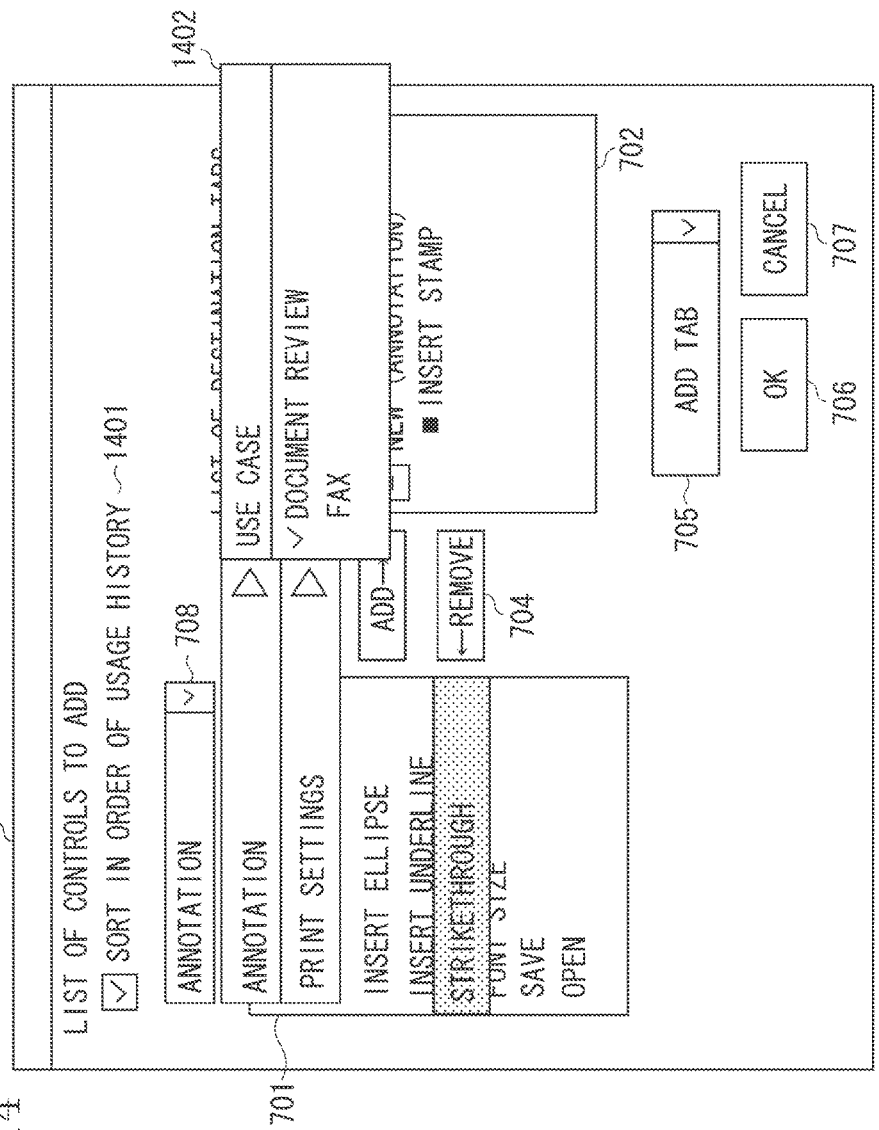
FIG. 14 illustrates an example of a user interface (UI) customization dialog.

FIG. 14 illustrates an example of a UI screen displayed on the display unit 202 illustrated in FIG. 2. The UI screen is a UI customization dialog 1400. Further, the UI screen realizes a change in the display method by adding the following processing for the control to step S1012 in FIG. 10.

In FIG. 14, a control 1401 is used when it is determined whether to display commands in the order of usage history in the list 701 of commands to be added. In the case of displaying the commands in the order of usage history, the control IDs are held in the order of usage. The control ID list 1211 is referred to for the usage history, and the display order of the customizable commands displayed in the command list 701 is rearranged.

A control 1402 is used to set filtering of the list 701 of commands to be added. In FIG. 14, the filtering can be performed based on the operation purpose (use case). Candidates of the operation purpose are acquired by referring to the group 1221, which indicates a group attribute of the control information 920. "Document review" and "Facsimile," which are use cases of the annotation mode, are available for choice, and "Document review" is selected. In this state, only the commands that hold the document review in the group 1221 are displayed in the command list 701.

Further, when the UI customization dialog 1400 is displayed, the usage history 1210 may be referred. If the most-recently-used command exists in the command list 701, a control having the command may be changed to a selected state. In this way, the displayed contents of the UI customization dialog 1400 are controlled so that a command desired by the user can be found with ease.

According to the third exemplary embodiment, a UI in which functions desired by the user are combined together based on a predetermined filter can be generated in an application including an edit command usable only in a specific edit mode and a shared command usable in a plurality of modes.

As described above in the first to third exemplary embodiments, a customization UI in which controls of functions desired by the user are appropriately arranged can be generated with ease in an application including a plurality of user interfaces each displaying contents corresponding to each of a plurality of edit modes.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-177848, filed Sep. 2, 2014, which is hereby incorporated by reference herein in its entirety.

What is claimed is:

1. An information processing apparatus including a document editing application configured to retain, as a mode, a combination of commands including at least one of a command used in executing a document operation on a document and a command used in executing a print operation on the document, the information processing apparatus comprising:
- a memory storing instructions; and
- a processor which is capable of executing the instructions causing the information processing apparatus to:
  - provide an edit screen for editing a command associated with the mode;
  - determine whether a command associated with a first mode set as an editing target is editable;
  - display the command associated with the first mode on the edit screen in a case where it is determined that the command associated with the first mode is editable;
  - set a second mode, which is a default mode set in advance, as the editing target in a case where it is determined that the command associated with the first mode is not editable; and
  - display the command associated with the second mode on the edit screen.

2. The information processing apparatus according to claim 1, wherein the modes include at least one of a mode for editing contents of a page in a document and a mode for editing a print setting of the document.

3. The information processing apparatus according to claim 1, wherein the instructions further cause the information processing apparatus to edit a control arranged in a tool bar displayed on the plurality of tab sheets.

4. The information processing apparatus according to claim 1, wherein the command displayed on the edit screen is executable in the mode set as the editing target and is editable on the edit screen.

5. The information processing apparatus according to claim 1, wherein the processor further causes the information processing apparatus to manage information indicating whether the command associated with the mode is editable, wherein it is determined whether one editable command or a plurality of editable commands is associated with the first mode based the managed information.

6. The information processing apparatus according to claim 1, wherein the processor further causes the information processing apparatus to provide switching of a mode set as the editing target to another mode on the edit screen.

7. A method of controlling an information processing apparatus including a document editing application configured to retain, as a mode, a combination of commands including at least one of a command used in executing a document operation on a document and a command used in executing a print operation on the document, the method comprising:
- providing an edit screen for editing a command associated with the mode;
- determining whether a command associated with a first mode set as an editing target is editable;
- displaying the command associated with the first mode on the edit screen in a case where it is determined that the command associated with the first mode is editable;
- setting a second mode, which is a default mode set in advance, as the editing target in a case where it is determined that the command associated with the first mode is not editable; and
- displaying the command associated with the second mode on the edit screen.

8. A non-transitory computer-readable medium storing computer executable instructions, which when executed by a computer of an information processing apparatus including a document editing application configured to retain, as a mode, a combination of commands including at least one of a command used in executing a document operation on a document and a command used in executing a print operation on the document, cause the information processing apparatus to:
- provide an edit screen for editing a command associated with the mode;
- determine whether a command associated with a first mode set as an editing target is editable;
- display the command associated with the first mode on the edit screen in a case where it is determined that the command associated with the first mode is editable;
- set a second mode, which is a default mode set in advance, as the editing target in a case where it is determined that the command associated with the first mode is not editable; and
- display the command associated with the second mode on the edit screen.

* * * * *